United States Patent [19]

Nakanishi et al.

[11] 4,019,026

[45] Apr. 19, 1977

[54] LASER BEAM LABEL READER HEAD

[75] Inventors: Sadao Nakanishi; Nobufumi Tokura, both of Ise, Japan

[73] Assignee: Shinko Electric Co., Ltd., Tokyo, Japan

[22] Filed: Sept. 23, 1975

[21] Appl. No.: 616,057

[52] U.S. Cl. ............... 235/61.11 E; 340/146.3 Z; 350/3.5

[51] Int. Cl.² ............ G06K 7/14; G02B 5/08; G06K 9/10

[58] Field of Search ........... 235/61.11 E; 250/568, 250/569; 340/146.3 Z, 146.3 F; 350/3.5; 356/71

[56] References Cited

UNITED STATES PATENTS

| 3,417,231 | 12/1968 | Stites | 235/61.11 E |
|---|---|---|---|
| 3,708,655 | 1/1973 | Schanne | 235/61.11 E |
| 3,744,026 | 7/1973 | Wolff | 340/146.3 Z |
| 3,796,863 | 3/1974 | Nicki | 235/61.11 E |
| 3,812,374 | 5/1974 | Tuhro | 250/568 |

Primary Examiner—Robert M. Kilcore
Attorney, Agent, or Firm—Lane, Aitken, Dunner & Ziems

[57] ABSTRACT

A laser beam label reader head of single common axis type wherein light reflection coming from a laser-irradiated label along the axis of a scanning laser beam is diverted by an apertured mirror toward a photoelectric converter. The photoelectric converter is provided with means for removing and blocking incident general light coming from sources other than the laser-irradiated label to preclude influences by ambient light and improve S/N ratio.

2 Claims, 2 Drawing Figures

LASER BEAM LABEL READER HEAD

BACKGROUND OF THE INVENTION

This invention relates to a label reader of the class using a laser light beam and more particularly to a head construction for such label readers.

In discussing prior art, reference is had to FIG. 2 of the accompanying drawings which shows a typical example of the conventional laser beam label reader. As shown in FIG. 2, the head of the conventional reader has a fixed light receiving axis P and is therefore required to have a wide view angle Q to receive light signals from labels 20, 21 and 22. However, a head with a wide view angle is easily influenced by ambient light and has met difficulties in improving the S/N ratio. More particularly, if the sensitivity of a photomultiplier tube 23 is increased, it will be easily saturated with the ambient light and become incapable of picking up signal light. In this connection, it may occur to use various filters such as an ND filter and the like for the purpose of limiting the light amount. However, the use of such filters will contribute to attenuate the light signals as well. Even if an interference filter which passes only laser light is used, the ambient light contains components of the wavelength same as that of the signal light in a large quantity and therefore will drive the photoelectric multiplier also into the saturated range, making it utterly difficult to improve the S/N ratio.

SUMMARY OF THE INVENTION

With the foregoing in view, the present invention has as its object the provision of a laser beam label reader head which is free from influences of ambient light and gives an improved S/N ratio.

It is a more particular object of the invention to provide a laser beam label reader head of the common axis type wherein portion of weak scattering light reflections from an information source along the axis of the scanning laser beam is led to a light receiving portion of the head, in a very limited view angle so as to cover substantially only the laser-irradiated spot.

In one preferred form of the invention, the laser beam label reader head comprises in combination; a laser tube mounted in a fixed position for radiating a laser beam; a polyhedral rotating mirror located in position to deflect the laser beam from the laser tube toward a label to scan code information on the label; an apertured mirror positioned between the laser tube and polyhedral rotating mirror and having a center aperture to allow passage therethrough of the laser beam from the laser tube, the apertured mirror being held in a slanting position to divert portion of light reflections which comes from the laser-irradiated label along the axis of the scanning laser beam; and a photoelectric converter located in position to receive the diverted light portion and adapted to pick up laser light signals for conversion into corresponding electric signals.

It is preferred that the photoelectric converter is provided with an interference filter to pass laser light only and remove other incident general light components, a condensing lens and a diaphragm for blocking disturbing light from sources other than the laser-irradiated label, and a photomultiplier tube located behind the interference filter, condensing lens and diaphragm.

The above and other objects, features and advantages of the invention will become apparent from the following description and appended claims taken in conjunction with accompanying drawing which show by way of example a preferred embodiment of the invention.

Figure 1:
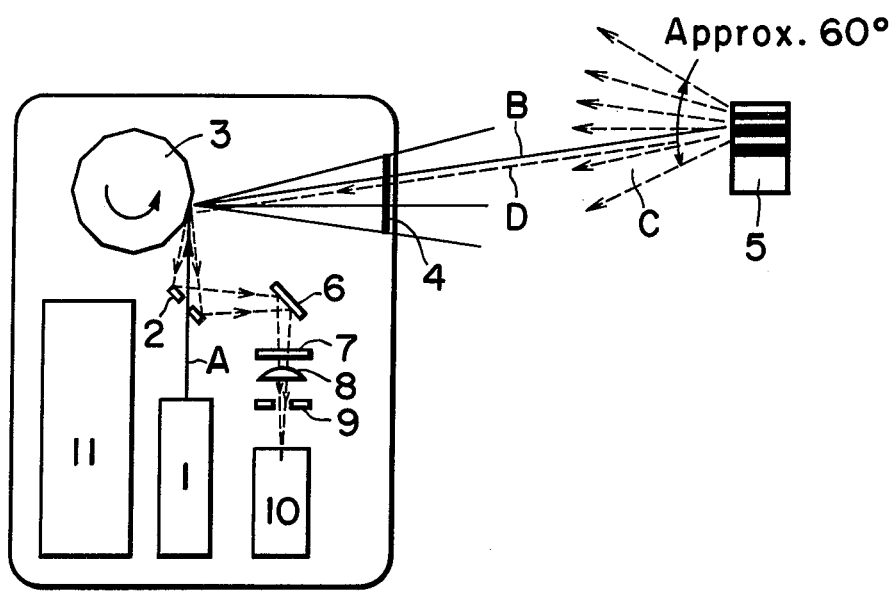
FIG. 1 is a diagrammatic view of a laser beam label reader head embodying the present invention.
Figure 2:
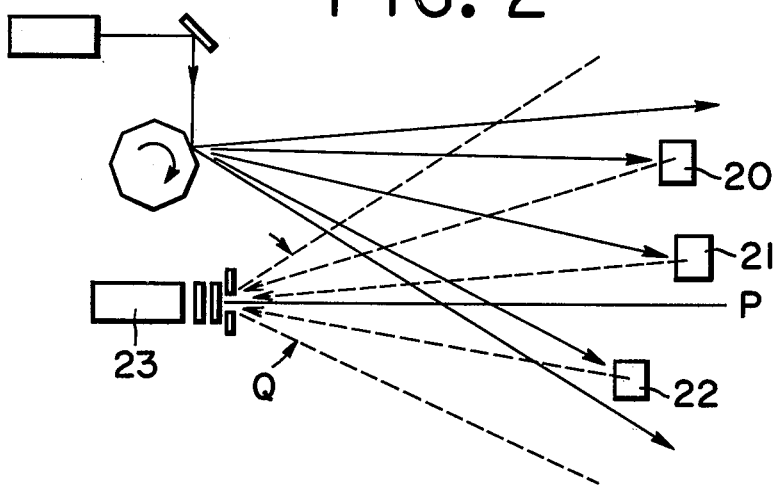
FIG. 2 is a diagrammatic view of a conventional reader head of the same class.

DESCRIPTION OF PREFERRED EMBODIMENT:

Referring to FIG. 1 of the accompanying drawing, the laser beam label reader head according to the invention comprises a laser tube 1, an apertured mirror 2, a rotating mirror 3 and a window 4. Indicated at 5 is an information source in the form of a label to be read by the reader. The reader head further includes a total reflection mirror 6, an interference filter 7, a condensing lens 8, a diaphragm 9, a photomultiplier tube 10 and a high voltage power source 11.

An irradiating laser beam A from the laser tube 1 is passed through the center aperture of the mirror 2 toward the rotating polyhedral mirror 3 rotating at constant velocity reflection reflction thereon. The laser light deflected by the rotating mirror 3 is directed outwardly as a scanning beam B through the window 4 on the front side of the head toward the label 5. The scanning laser beam B hitting upon the label 5 is reflected thereon and produces scattering reflections C according to the code information on the label 5. A portion D of the scattering reflections C which is directed toward the apertured mirror 2 takes the same route as the projected scanning beam A halfway to the apertured mirror 2. The reflected light portion D is reflected again on the apertured mirror 2 and diverted from the passage of the laser beam A. The diverted light portion D is led to the photoelectric converted after total reflection on the afore-mentioned total reflection mirror 6. The photoelectric converter comprises, as stated above, an interference filter 7, a condensing lens 8, a diaphragm 9 and a photomultiplier tube 10. After total reflection on the mirror 6, the reflected light portion is passed through the interference filter 7 which passes only laser light and removes other general light components. Laser light from sources other than the label 5 are blocked through the condensing lens 8 and diaphragm 9 so that the photomultiplier tube 10 receives only the signal light which corresponds to the code information indicated on the lavel 5, for conversion into electric signals in the usual manner.

As will be understood from the foregoing description, the light projection and reception are effected along one common axis in the present invention. The reflected light is separated by reflection on the apertured mirror. By the provision of the interference filter, condensing lens and diaphragm in front of the photomultiplier tube, the photoelectric converter has sufficient sensitivity even to weak light reflections from the label without being influenced by ambient light to any material degree.

Although the invention has been described in a preferred embodiment, it will be apparent to those skilled in the art that various changes and modifications can be made without departing from the scope of the invention as encompassed by the appended claims.

What is claimed is:

1. A laser beam label reader head for reading code information on a label by irradiation of a laser beam, comprising in combination:
   a laser tube for radiation of a laser beam;
   a polyhedral rotating mirror located in position to reflect the laser beam from said laser tube toward a label to scan code information on the label;
   an apertured mirror positioned between said laser tube and said polyhedral rotating mirror and having a center aperture to allow passage therethrough of said laser beam from said laser tube, said apertured mirror being held in a slanting position to divert a portion of the light reflections which comes from said label along the axis of the scanning laser beam; and
   an photoelectric converter located in position to receive the diverted light portion and adapted to pick up light signals therefrom for conversion into corresponding electric signals.

2. A laser beam label reader head as claimed in claim 1, wherein said photoelectric converter comprises filter means adapted to pass laser light only and remove other general light components, a condensing lens and a diaphragm for blocking disturbing light from sources other than the laser irradiated label, and a photomultipler tube located behind said filter means, condensing lens and diaphragm.

* * * * *

UNITED STATES PATENT OFFICE
CERTIFICATE OF CORRECTION

Patent No. 4,019,026                Dated April 19, 1977

Inventor(s) Sadao Nakanishi et al

It is certified that error appears in the above-identified patent and that said Letters Patent are hereby corrected as shown below:

Column 2, line 26, "velocity reflection reflction" should read --velocity for reflection--;

line 39, "converted" should be --converter--.

Claim 1, line 13, "reflections" should be --reflection--.

*Signed and Sealed this*

*fifth* Day of *July 1977*

[SEAL]

Attest:

RUTH C. MASON
*Attesting Officer*

C. MARSHALL DANN
*Commissioner of Patents and Trademarks*